United States Patent [19]
McKeown et al.

[11] Patent Number: 6,091,607
[45] Date of Patent: Jul. 18, 2000

[54] RESONANT TAG WITH A CONDUCTIVE COMPOSITION CLOSING AN ELECTRICAL CIRCUIT

[75] Inventors: Thomas James McKeown, Pennsauken, N.J.; Stanley Tocker, Wilmington, Del.

[73] Assignee: Checkpoint Systems, Inc., Thorofare, N.J.

[21] Appl. No.: 09/209,172

[22] Filed: Dec. 10, 1998

[51] Int. Cl.[7] .................................................. H05K 7/06
[52] U.S. Cl. ........................ 361/777; 361/765; 361/772; 361/782; 257/531; 257/532; 340/572; 340/572.3; 340/572.5
[58] Field of Search .................................. 361/765, 766, 361/767, 772, 782, 783, 777; 257/531, 532; 340/572, 572.3, 572.5

[56] References Cited

U.S. PATENT DOCUMENTS

| | | | |
|---|---|---|---|
| 4,021,705 | 5/1977 | Lichtblau | 361/765 |
| 4,498,076 | 2/1985 | Lichtblau | 340/572.3 |
| 4,567,473 | 1/1986 | Lichtblau | 340/572.3 |
| 4,745,401 | 5/1988 | Montean | 340/572 |
| 4,797,785 | 1/1989 | Jorgensen | 361/766 |
| 4,835,524 | 5/1989 | Lamond et al. | 340/572.3 |
| 4,876,555 | 10/1989 | Jorgensen | 343/895 |
| 5,103,210 | 4/1992 | Rode et al. | 340/572.3 |
| 5,142,270 | 8/1992 | Appalucci et al. | 340/572.3 |
| 5,182,544 | 1/1993 | Aquilera et al. | 340/572.5 |
| 5,276,431 | 1/1994 | Piccoli et al. | 340/572.5 |
| 5,510,769 | 4/1996 | Kajfez et al. | 340/572.5 |
| 5,574,431 | 11/1996 | McKeown et al. | 340/572.5 |
| 5,708,419 | 1/1998 | Isaacson et al. | 340/572 |
| 5,754,110 | 5/1998 | Appalucci et al. | 340/572 |
| 5,841,350 | 11/1998 | Appalucci et al. | 340/572 |
| 5,861,809 | 1/1999 | Eckstein et al. | 340/572 |

*Primary Examiner*—Leo P. Picard
*Assistant Examiner*—David Foster
*Attorney, Agent, or Firm*—Akin, Gump, Strauss, Hauer & Feld, L.L.P.

[57] ABSTRACT

Briefly stated a tag includes a dielectric substrate having first and second opposite principal surfaces. An electrical circuit having an electrically conductive pattern is formed on at least one of the principal surfaces of the dielectric substrate, the conductive pattern including a gap which establishes an electrical open circuit. An electrically conductive composition including electro-conductive particles is provided for bridging the gap in the conductive pattern to temporarily establish an electrical closed circuit which resonates when exposed to electromagnetic energy at a frequency within a predetermined frequency range.

30 Claims, 2 Drawing Sheets

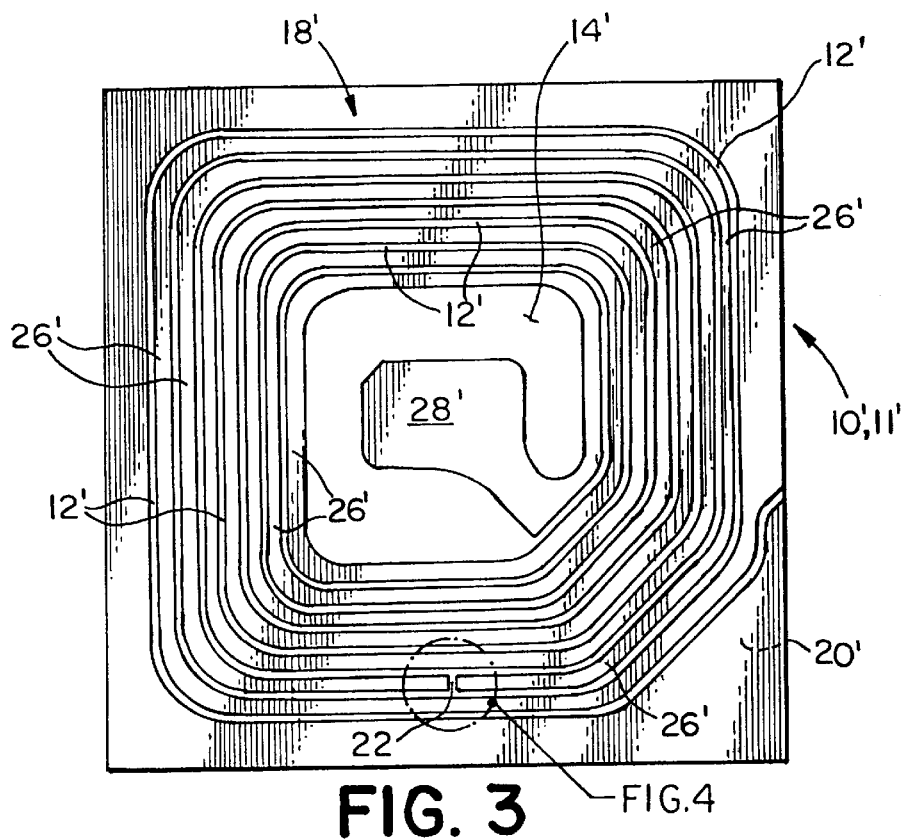
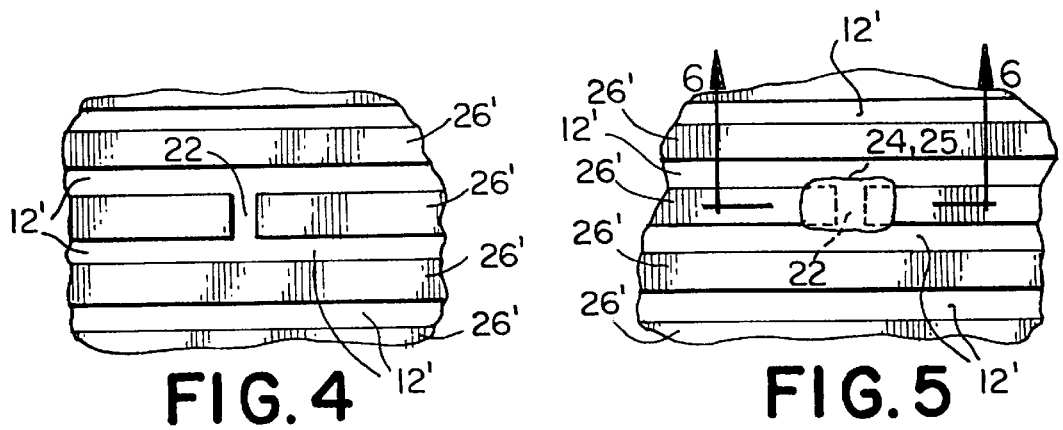
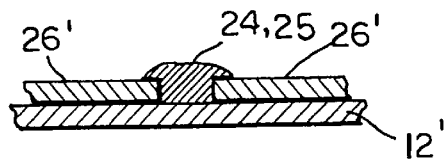

RESONANT TAG WITH A CONDUCTIVE COMPOSITION CLOSING AN ELECTRICAL CIRCUIT

BACKGROUND OF THE INVENTION

The present invention relates to security tags and, more particularly, to deactivatable security tags for use with electronic article surveillance systems for the detection of unauthorized removal of articles from secured spaces.

Electronic article surveillance (EAS) systems for detecting and preventing theft or unauthorized removal of articles or goods from retail establishments and/or other facilities, such as libraries, are well known and widely used. In general, such security systems employ a label or security tag which is affixed to, associated with, or otherwise secured to an article or item to be protected or its packaging. Security tags may take on many different sizes, shapes, and forms, depending on the particular type of security system in use, the type and size of the article, etc. In general, such security systems detect the presence of an active security tag as the security tag (and thus the protected article) passes through a surveillance zone or passes by or near a security checkpoint.

Certain prior art security tags work primarily with radio frequency (RF) electromagnetic field disturbance sensing electronic security systems, such as, but not limited to those disclosed in U.S. Pat. No. 3,810,147 entitled "Electronic Security System", U.S. Pat. No. 3,863,244 entitled "Electronic Security System Having Improved Noise Discrimination", and U.S. Pat. No. 5,276,431 entitled "Security Tag For Use With Article Having Inherent Capacitance", and their commercially available implementations and counterparts. Such electronic security systems generally establish a radio frequency (RF) electromagnetic field in a surveillance zone through which articles must pass when being removed from the controlled premises. A tag having a resonant circuit is attached to each article, and the presence of the resonant circuit in the surveillance zone is sensed by a receiving system to denote the unauthorized removal of an article.

Articles which are authorized for removal from the controlled premises require the attached security tag to be deactivated prior to removal. Physical deactivation of a tag having a resonant circuit may be performed by: (1) altering the tag to detune or disable the resonant circuit, (2) shielding the resonant circuit from the incident RF energy or (3) removing the tag from the article. All of these physical deactivation techniques require the security tag be identifiable and accessible, which prohibits the use of tags embedded within merchandise at undisclosed locations or tags concealed in or upon the packaging.

The trend in the electronic article surveillance industry is to install a tag in a product at the time the product is being manufactured, since at this stage, it is relatively inexpensive to install the tag and also because the tag may be concealed or hidden from view thereby discouraging fraud. Embedding the tag in the product or the product packaging requires that the tag be remotely deactivatable.

Remote tag deactivation may be achieved by electromagnetic means. Such tags can be conveniently deactivated at a checkout counter or other such location by being momentarily placed above or near a deactivation device which subjects the tag to RF energy at a power level sufficient to cause one or more components of the security tag's resonant circuit to either short circuit or open, depending upon the detailed structure of the tag. Typical methods for causing an open or short circuit employ dielectric breakdown and fusible links. All such techniques require a predetermined RF energy level from specialized equipment to properly deactivate the tags.

There are circumstances where tags may be installed in articles, and the articles put into legitimate use without the tag first being deactivated. There is a need to permanently deactivate such tags during use without benefit of specialized equipment in order to minimize the likelihood that the tag will later create a false alarm if the article should later pass through an article surveillance system.

BRIEF SUMMARY OF THE INVENTION

Briefly stated, the present invention comprises a tag which includes a dielectric substrate having first and second opposite principal surfaces. An electrical circuit having an electrically conductive pattern is formed on at least one of the principal surfaces of the dielectric substrate, the conductive pattern including a gap which establishes an electrical open circuit. An electrically conductive composition including electro-conductive particles is provided for bridging the gap in the conductive pattern to temporarily establish an electrical closed circuit which causes the resonant circuit to resonate when exposed to electromagnetic energy at a frequency within a predetermined frequency range. The present invention further comprises a method of making a tag. The method includes the steps of forming an electrical circuit having an electrically conductive pattern on a dielectric substrate, forming a gap in the conductive pattern to establish an open circuit, applying a liquid composition to the conductive pattern to bridge the gap in the conductive pattern and drying the liquid composition to form an electrically conductive composition to cause the circuit to resonate when exposed to electromagnetic energy at a frequency within a predetermined frequency range. The present invention further comprises a method for deactivating a tag. The method includes the steps of forming an electrical circuit having an electrically conductive pattern on a dielectric substrate, forming a gap in the conductive pattern to establish an open circuit, applying a liquid composition to the conductive pattern to bridge the gap in the conductive pattern, drying the liquid composition to form an electrically conductive composition to cause the circuit to resonate when exposed to electromagnetic energy at a frequency within a predetermined frequency range, and reestablishing the gap in the conductive pattern such that the circuit no longer resonates at a frequency within the predetermined frequency range.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 3 is a plan view of a first principal surface of a tag having a gap in a conductive path in accordance with a preferred embodiment of the present invention;

FIG. 4 is an enlarged fragmentary view of a portion of the tag of FIG. 3 illustrating the gap in the conductive path;

FIG. 5 is an enlarged fragmentary view of a portion of the tag of FIG. 3 illustrating a conductive composition bridging the gap; and FIG. 6 is a is a cross-sectional view of the gap in the conductive path with the conductive composition bridging the gap, taken along line 6—6 of FIG. 5.

DETAILED DESCRIPTION OF THE INVENTION

Figure 1:
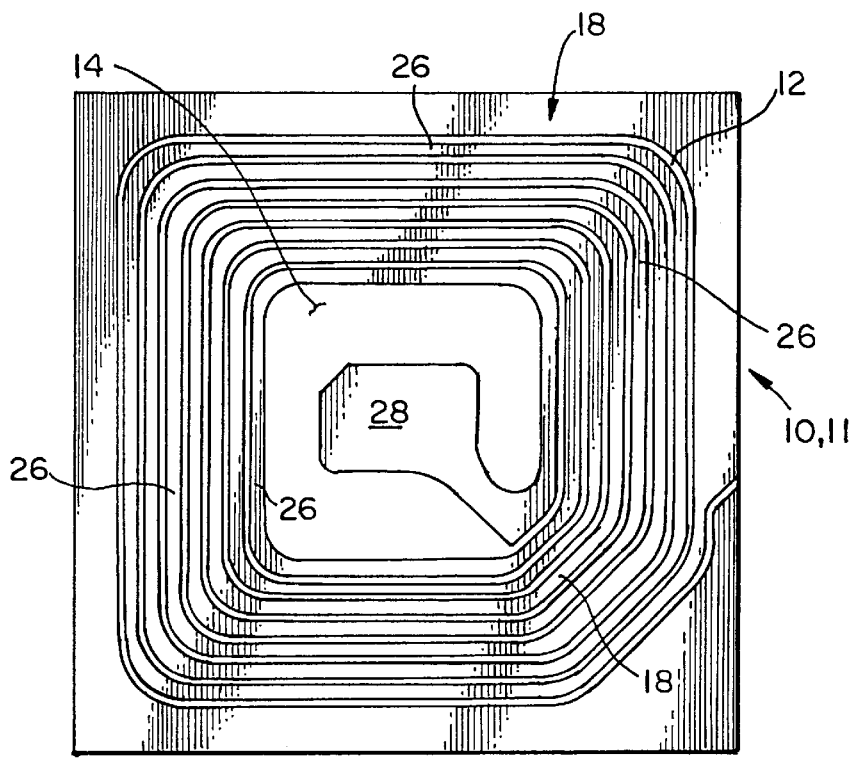
FIG. 1 is a plan view of a first principal surface of a typical prior art tag.
Figure 2:
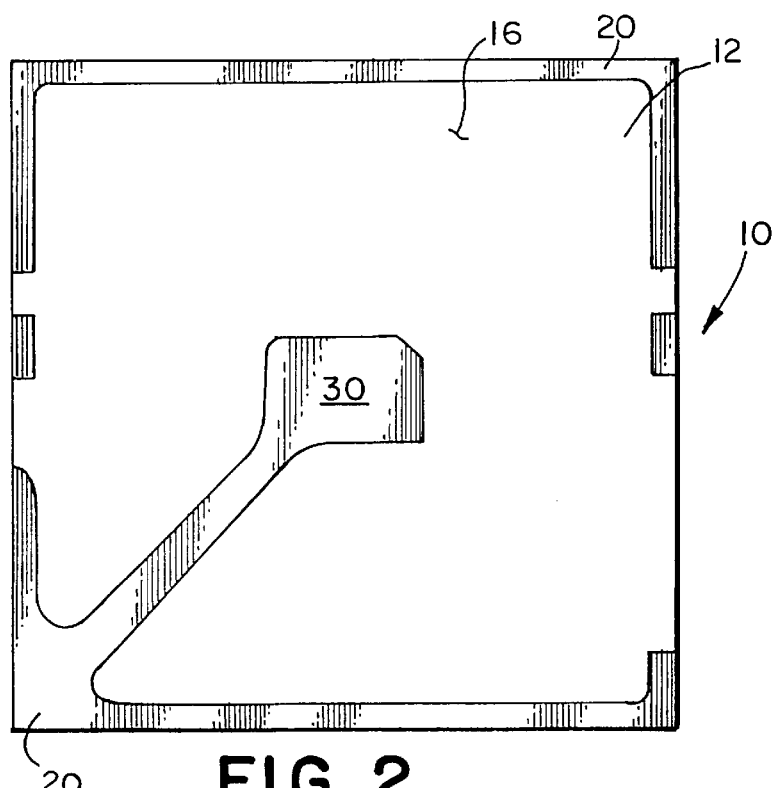
FIG. 2 is a plan view of a second opposite principal surface of the tag shown in FIG. 1.

Referring now to the drawings wherein the same reference numeral designations are applied to corresponding elements throughout the several figures, there is shown in FIGS. 1 and 2 a typical security tag or tag 10 for use with an electronic article security system. The tag 10 is generally of a type which is well known in the art of electronic article security systems, having two operational states: (1) an active state in which the tag 10 is detectable by an electronic article security system and (2) an inactive state in which the tag 10 is not normally detectable by an electronic article security system. As is well known in the art, the tag 10 is adapted to be secured to or otherwise borne by an article or item, or the packaging of such article for which security or surveillance is sought. The tag 10 may be secured to the article or its packaging at its retail or other such facility, or as is presently preferred, secured or incorporated into the article or its packaging by a manufacturer or wholesaler of the article.

The tag 10 is employed in connection with an electronic article security system (not shown), particularly an electronic article security system of the radio frequency or RF type such as exemplified by U.S. Pat. No. 3,863,244 entitled "Electronic Security System Having Improved Noise Discrimination" which is incorporated herein by reference. Such electronic article security systems are well known in the art and therefor, a complete description of the structure and operation of such electronic article security systems is not necessary for an understanding of the present invention. Suffice it to say that such electronic article security systems establish a surveillance area or zone, generally proximate to an entrance or exit of a facility, such as a retail store. The function of the security system is to detect the presence within the surveillance zone of an article having an active security tag 10 secured to the article or secured to the article packaging.

The security tag 10 includes components hereinafter described in greater detail which establish a resonant circuit 11 which resonates when exposed to RF energy at or near a predetermined detection resonant frequency. A typical electronic article security system employing the tag 10 includes means for transmitting RF energy of a frequency at or near the resonant frequency of the security tag 10 into or through the surveillance zone and means for detecting an RF field disturbance that is caused by the presence of the security tag 10 resonant circuit 11 to establish the presence of the security tag 10 and thus a protected article, within the surveillance zone.

The typical tag 10, shown in FIGS. 1 and 2, comprises a generally rectangular, planar insulative or dielectric substrate 12 having first and second opposite principal surfaces 14, 16. The substrate material may be any solid material or composite structure of material so long as it is insulative and can be used as a dielectric. Preferably the substrate 12 is formed of an insulated dielectric material of a type well known in the art, for example, a polymeric material such as polyethylene. However, it will be recognized by those skilled in the art that other dielectric materials may alternatively be employed in forming the substrate 12.

The tag 10 further comprises circuitry located on the substrate 12 for establishing at least one resonant circuit 11 by forming predetermined circuit elements or components on both principal surfaces 14, 16 of the substrate 12 which will be hereinafter described. The circuit elements are formed by a combination of a first conductive pattern 18 imposed on the first principal surface 14 of the substrate 12 best seen in FIG. 1, which surface is arbitrarily selected as the top surface of the tag 10, and a second conductive pattern 20 is imposed on the opposite side or second principal surface 16 of the substrate 12 (best seen in FIG. 2).

The conductive patterns 18, 20 are formed on the substrate surfaces 14, 16, respectively, with electrically conductive materials of a known type and in a manner which is well known in the electronic article surveillance art. The conductive material is preferably patterned by a subtractive process (i.e. etching), whereby unwanted conductive material is removed by chemical attack after the desired conductive material for forming the conductive patterns 18, 20 has been protected, typically with a printed-on etch resistant ink. A suitable method for forming such conductive patterns is described in detail in U.S. Pat. No. 3,913,219 entitled "Planar Circuit Fabrication Process" which is incorporated by reference. In the present embodiment, the conductive material is aluminum. However, other conductive materials (e.g., gold, nickel, copper, phosphor bronzes, brasses, solders, high density graphite, aluminum filled conductive epoxies or silver-filled conductive epoxies) can be substituted for aluminum without changing the nature of the resonant circuit 11 or its operation. While it is preferred that the material and methods set forth in the above referenced U.S. Pat. No. 3,913,219 and other prior art be employed for fabricating the security tag 10, it will be appreciated by those skilled in the art that other suitable electrically conductive materials and/or fabrication methods could alternatively be employed.

The first and second conductive patterns 18, 20 establish a resonant circuit 11 having a resonant frequency within the detection range of the electronic article security system with which the tag 10 is employed. In the case of the tag 10, the resonant circuit 11 is comprised of an inductance which is electrically connected in parallel with a capacitance. As best shown in FIG. 1 the inductance comprises an inductive coil 26 formed within the first conductive pattern 18. However, it will be recognized that the inductive coil 26 could be formed within the second conductive pattern 20, or could be formed in both conductive patterns 18, 20. Alternatively, there could be a plurality of inductive coils formed within the first and/or second conductive patterns 18, 20. Further, the conductive patterns 18, 20 need not form an inductive coil 26 but, for instance, could establish an inductive reactance from formation of an electrical transmission line constructed by strip line or microstrip methods and be within the spirit and scope of the invention.

The resonant circuit of tag 10 further includes a capacitor element having a first plate formed by a first generally rectangular land portion 28 of the first conductive pattern 18, as shown in FIG. 1, and a second plate formed by a second generally rectangular land portion 30 of the second conductive pattern 20 as shown in FIG. 2. The conductive land patterns 28, 30 are separated by the dielectric substrate 12 to form the capacitor element. Referring now to FIGS. 1 and 2 the resonant circuit 11 is formed by the combination, in a series loop, of the inductive coil 26 electrically connected on one end to the generally rectangular land portion 28 of the first conductive pattern 18 and on the other end to the generally aligned rectangular land portion 30 of the second conductive pattern 20, by a link (not shown) which passes through the dielectric substrate 12 to electrically connect the conductive patterns 18, 20. Although the preferred embodiment of the tag 10 includes a single capacitor formed by the land portions 28, 30, multiple capacitor elements could alternately be employed and still be within the spirit and scope of the invention.

The tag 10 as thus far described is typical of security tags which are well known in the electronic security and surveillance art and have been in general usage. In forming such security tags, the area of the inductive coil 26 and the areas of the overlap of the capacitor plates 28, 30 are carefully selected so that the resonant circuit 11 formed thereby has a predetermined resonant frequency which generally corresponds to or approximates a detection frequency employed in an electronic article security system for which the tag 10 is designed to be employed. In the present embodiment, the tag 10 resonates at or near 8.2 megahertz which is a frequency commonly employed by electronic article security systems from a number of manufacturers. However, this specific frequency is not to be considered a limitation of the present invention.

The resonant circuit 10 can be altered through the use of remote electronic devices. Such circuit alteration, which may be either activation or deactivation of the tag 10, may occur at a manufacturing facility or at a checkout counter when a person purchases an article with an embedded or affixed security tag 10, depending upon the intended use of the tag. Deactivation of the tag 10, which typically occurs at the point of sale, prevents the resonant circuit 11 from resonating so that the electronic article security system no longer detects the article in the surveillance zone. Various physical methods have been developed for deactivating security tags 10, such as physically removing the tag 10 from the article or covering the tag with a shielding or detuning device such as a metalized sticker. Other methods involve exposing the tag 10 to predetermined energy levels to cause creation of an open circuit or short circuit within the tag 10, usually through the use of a weak link or dimple in the conductive pattern designed to change electrical characteristics in a predictable manner upon exposure to sufficient energy.

The present invention provides a further means for deactivating the resonant circuit 11' of the tag 10' by including a non-conductive gap 22 in at least one of the conductive patterns 18', 20' (not shown) to form an electrical open circuit as shown in FIGS. 3–6, where the prime designations refer to like parts of the present embodiment and the prior art and the alternative methods of prior art tag 10 construction apply equally well to the present embodiment. It is understood by those skilled in the art that the term "open circuit" implies an electrical circuit condition in which either: (1) the "Q" of the resonant circuit 11' is sufficiently reduced such that the resonant circuit 11' does not disturb the RF field produced by an electronic article surveillance system sufficiently to be detected, or (2) the resonant frequency of the resonant circuit 11' is outside a predetermined detection range of an electronic article surveillance system, or (3) the resonant circuit 11' does not resonate. In the present embodiment the gap 22 is formed in the inductive coil 26' at the time the first conductive pattern 18' is formed using the previously described "Planar Circuit Fabrication Process". Alternatively, the gap 22 may be formed by removing a portion of the conductive pattern 18' after it is formed, by selective acid etching, or by cutting away or otherwise removing a portion of the already formed conductive pattern 18' with a sharp instrument and removing a section of the material. It is understood by those skilled in the art that other methods or techniques could be used to form the gap 22 so as to form an open circuit, within the spirit and scope of the invention. Further, the gap 22 could be formed in any portion of either conductive pattern 18', such as between the inductive coil 26' and the rectangular land portion 28', and multiple gaps 22 could be formed throughout the conductive patterns 18', 20' within the spirit and scope of the invention.

In the present embodiment, shown in FIGS. 5 and 6, a conductive composition 24 bridges the gap 22 in the conductive pattern 18' to at least temporarily establish an electrical closed circuit condition in the conductive pattern 18' which enables the resonant circuit 11' to resonate when exposed to RF energy at a frequency within a predetermined frequency range. It is understood by those skilled in the art that the term "closed circuit" implies an electrical circuit condition that enables the resonant circuit 11' to resonate at a frequency within a predetermined frequency range with sufficiently high "Q" to be detected by an electronic article surveillance system when the tag is within the surveillance zone. In the present embodiment, the Q of the resonant circuit is preferably in the range 50–80 when the gap 22 is bridged with the conductive composition 24. However, it is understood by those skilled in the art that the circuit Q may be greater than or smaller than the preceding range, depending on the electronic article security system with which the tag 10' is designed to operate with, and still be within the spirit and scope of the invention. It is also understood that where there is a plurality of gaps 22, the conductive composition 24 is applied to each gap 22 to establish a closed circuit and further that the specific composition of the conductive composition 24 may be different for application to each gap 22 in order to achieve a variety of tag deactivation properties in the tag 10'.

The conductive composition 24 is preferably formed by drying a liquid composition 25 comprising a solution, suspension or dispersion of a matrix material in a solvent base into which conductive particles are dispersed or otherwise suspended. An applicator may be used to apply the liquid composition 25 to the conductive pattern 18'. The gap 22 is preferably filled with the liquid composition 25 so as to bridge the gap 22 in the conductive pattern 18' as shown in FIGS. 5–6. Subsequent to the application of the liquid composition 25 to the conductive pattern 18', the solvent base of the liquid composition 25 is removed by drying, leaving the conductive composition 24 adhering to the conductive pattern 18' and dielectric 12'. The conductive composition 24 is preferably dried by heat but could also be dried by evaporation at ambient temperature, by infrared rays or other suitable means within the spirit and scope of the invention.

The first preferred embodiment of the conductive composition 24, sensitive to water after drying, comprises water as a solvent base, a matrix material of water soluble polyvinyl alcohol and conductive metal particles. A suitable and preferred polyvinyl alcohol is the polyvinyl alcohol available under the trade name Elvanol™ available from E.I. DuPont as Part Number 52-22. The conductive particles are preferably silver and preferably under about 10 microns in size. The preferred embodiment of the water sensitive conductive composition 24 is constituted by first forming an aqueous solution of about 90 percent by weight water and about 10 percent by weight Elvanol™. A quantity of silver particles generally equal to the weight of the Elvanol™/water solution is then added to the Elvanol™/water solution to form the liquid composition 25. It will be understood that the percentages and amounts of the constituents of the liquid composition 25 may vary provided that the conductive composition 24 is capable of exhibiting the desired conductive and physical properties. In forming the matrix material, the percentage of Elvanol™ preferably varies from about 1 percent to about 12 percent by weight of the Elvanol™/water solution. Further, in forming the conductive composition 24 the percentage of silver particles in the liquid composition 25 preferably varies from about 10 percent to about 70 percent of the liquid composition 25 by weight.

Further, it will be understood by those skilled in the art based on this disclosure that the formulation of the conductive composition 24 is not limited to silver particles, Elvanol™ and water. Other suitable conductive particles include conductive metals, metal alloys, conductive polymers or carbon. Other suitable matrix materials include a wide variety of one or more polymers including homopolymers and copolymers of vinyl, acrylic, styrene, vinyl pyrrolidone, cellulosic polymers, as well as polylactic acid and polyglycolic acid and derivatives thereof. Further, the solvent or suspension material in which the matrix material and metal is incorporated is not limited to a water solution but may include other aqueous solutions or organic solvents.

The conductive composition may also incorporate additives such as fillers, pigments, silica, talc, binders, suspending agents, thixotropic agents and the like to adjust the liquid composition 25 viscosity, sensitivity to solvents and flexure after evaporation, as required.

A second preferred embodiment of the dry conductive composition 24, sensitive to both water and dry cleaning solution (typically perchloroethylene) after drying comprises a solution of water soluble Evanol™, silver particles, water and polymethyl vinyl ether. A suitable and preferred polymethyl vinyl ether is the perchloroethylene sensitive polymethyl vinyl ether manufactured by the Aldrich Chemical Company as Part Number 18-272-9. The second preferred embodiment of the conductive composition 24 is formed by first preparing a first aqueous solution (A) of about 90 percent by weight water and about 10 percent by weight Elvanol™. A quantity of a second aqueous solution (B) of about 50 percent by weight polymethyl vinyl ether and about 50 percent by weight water is then provided to the first aqueous solution such that the weight of the second solution (B) is about 24 percent by weight of the final combined solution (A) and (B). A quantity of silver particles generally equal to the weight of the final combined solution is then added to the final combined solution to form the liquid composition 25. It will be understood that the percentages and amounts are not required to be precisely as set forth above and may vary provided that the conductive composition 24 is capable of exhibiting the desired conductive and physical properties.

The proportions of silver particles, polymethyl vinyl ether and Elvanol™ to the total weight of the conductive composition 24 preferably varies from about 10 percent to 70 percent by weight silver particles, from about 3 percent to 10 percent by weight polymethyl vinyl ether and about 2 to 10 percent by weight for Elvanol™ with the remainder being water. Further, it is understood by those skilled in the art that the conductive composition 24, sensitive to both water and dry cleaning fluid when dry, is not limited to silver particles, Elvanol™, polymethyl vinyl ether and water and that other conductive particles and matrix materials may be used, as discussed above, within the spirit and scope of the invention.

A third preferred embodiment of the conductive composition 24, frangible and not soluble in either water or dry cleaning fluid after drying, comprises a water-based dispersion of polymeric particles and water (latex) and metal particles. The third preferred embodiment of the conductive composition 24 is constituted by mixing the water-based dispersion manufactured under the trade name of Adcote™ by Morton International Company (Part Number 37T77) with a quantity of silver particles equal to about 60 percent by weight of the total weight of the liquid composition 25. It will be understood by those skilled in the art that the proportion of silver particles to Adcote™ need not be exactly 60 percent of the weight of the liquid composition 25 and that the percentage of silver particles provided the liquid composition 25 may be varied, providing the conductive composition 24 is capable of exhibiting the desired conductive and physical properties. The percentage of silver particles preferably varies from about 20 percent to about 70 percent for a preferred range of effectiveness. Further it is understood that the latex dispersion need not be comprised specifically of Adcote™ and silver particles. Other similar water-based dispersions such as those based on vinyls or acrylic polymers displaying suitable viscosity when liquid and frangibility when dry, and other conductive particles as set forth above, may be used, within the spirit and scope of the invention.

The present invention provides a means for deactivating the tag 10'. In the present invention, the tag 10' may be deactivated by exposing the conductive composition 24 to a fluid for a predetermined time to cause at least a portion of the conductive composition to dissolve, dissipate or disintegrate thereby causing the dispersal of at least a portion of the conductive composition 24 resulting in an electrical open circuit condition in the circuit 11' which prevents the circuit 11' from resonating within the predetermined frequency range. Alternatively, the tag 10' may be deactivated by exposing the tag 10' to a mechanical force for a predetermined time to cause the tag 10' to flex and thereby to cause at least a portion of the composition 24 to fracture or otherwise dissipate or disperse resulting in an electrical open circuit condition in the circuit 11' which prevents the circuit 11' from resonating within the predetermined frequency range. While it is preferred that the characteristics of the conductive composition 24 be altered by dissolving the composition 24 with a fluid or fracturing the composition 24 with a mechanical force, it is understood by those skilled in the art that the characteristics of the composition 24 could be altered by other physical or chemical changes to the composition 24 and also could be altered by methods other than exposure to a fluid or a mechanical force, including heat and sonics, without departing from the spirit and scope of the invention.

In use the tag 10' may, for example, be incorporated into an article of clothing such as a dress or shirt at the point of manufacture and prior to the shipment of the article to a retailer. The tag 10' would normally be deactivated, by any of the prior art means previously discussed, at the time the article was sold at retail. However, it is possible that the tagged article could be sold through channels not providing for normal deactivation. Alternatively, the tag 10' may not be properly deactivated at the point of sale. In either case, upon use of the dress or shirt, the conductive composition 24 would now provide an additional deactivation mechanism to that normally provided. For example, a tag 10' employing a soluble composition would dissolve to deactivate the tag 10' when exposed to a fluid such as might be encountered in normal washing of the dress or shirt, by cleaning in a dry cleaning solution or by exposure to bodily perspiration.

Similarly, the tag 10' employing a frangible composition 24, might be incorporated into an article, such as clothing, at a location in the clothing which exposes the tag 10' to a mechanical force sufficient to fracture the conductive composition 24 when the article is used for a predetermined time. For example, a shoe worn for a period of time or a shirt or trousers worn for a period of time would fracture the frangible conductive composition 24 and deactivate the tag lot. In some embodiments of the tag 10', the frangible conductive composition 24 might be constituted such that the tag 10' would retain its resonant properties following exposure to water or dry cleaning fluid for a predetermined time such as might be encountered in prewashing the clothing before sale of the goods. One skilled in the art will recognize that the use of the tag 10' with a conducting composition 24 for deactivating the tag 10' is not limited to use in clothing and that the tag 10' may be employed in other articles in which permanent deactivation is desired without departing from the spirit and scope of the invention.

The tag 10' is preferably assembled by the steps of: (1) laminating an electrically conducting foil on at least one principal surface of a dielectric substrate 12', (2) forming an electrical circuit 11' from the electrically conductive film on the dielectric substrate 12' which comprises at least one electrically conductive pattern 18', 20', (3) forming a gap 22 in the conductive pattern 18', 20', and (4) applying a liquid composition 25 to the tag 10' with an applicator to bridge the gap 22 in the conductive pattern 18', 20' to cause the circuit 11' to resonate when the liquid composition 25 dries and when the tag 10' is exposed to RF energy at a frequency within a predetermined frequency range. The tag 10' is deactivated by reforming the gap 22 in the conductive pattern such that the circuit 11' no longer resonates at a frequency within the predetermined frequency range. It is understood by those skilled in the art that other means for assembly can be employed and that the order of the steps of assembly can be varied without departing from the spirit and scope of the invention. For instance, the gap 22 may be formed at the same time that the electrical circuit 11' is formed.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A tag comprising:
   a dielectric substrate having first and second opposite principal surfaces;
   an electrical circuit comprising an electrically conductive pattern formed on at least one of the principal surfaces of the dielectric substrate, wherein the conductive pattern includes a gap which establishes an electrical open circuit; and
   an electrically conductive composition including electro-conductive particles bridging the gap in the conductive pattern to temporarily establish an electrical closed circuit wherein the electrical circuit resonates when exposed to electromagnetic energy at a frequency within a predetermined frequency range wherein the electro-conductive particles are dispersed in a polymeric matrix material.

2. The tag of claim 1 wherein the electrical circuit includes an inductive element and the gap is formed in a portion of the inductive element.

3. The tag of claim 2 wherein the inductive element is a coil.

4. The tag of claim 2 wherein the inductive element is a transmission line.

5. The tag of claim 1 wherein exposing the conductive composition to a fluid for a predetermined time causes at least a portion of the composition to partially dissipate resulting in an electrical open circuit condition in the electrical circuit which prevents the electrical circuit from resonating within the predetermined frequency range.

6. The tag of claim 5 wherein the fluid is at least one of water and dry cleaning fluid.

7. The tag of claim 1 wherein the electro-conductive particles are selected from the group consisting of metals, metal alloys, conductive polymers and carbon.

8. The tag of claim 7 wherein the electro-conductive particles are metal and the metal is silver.

9. The tag of claim 1 wherein the polymeric matrix material is selected from the group consisting of homopolymers and copolymers of vinyl monomers, acrylate monomers, styrene, lactic acid, glycolic acid, vinyl pyrrolidone and cellulosic materials, and derivatives thereof.

10. The tag of claim 9 wherein the polymeric matrix material comprises polyvinyl alcohol.

11. A method of making a tag comprising the steps of:
    forming an electrical circuit on a dielectric substrate, the circuit comprising at least one electrically conductive pattern;
    forming a gap in the conductive pattern to establish an open circuit;
    applying a liquid composition to the conductive pattern to bridge the gap, the liquid composition including electro-conductive particles dispersed in one of a polymeric matrix material and a water based dispersion; and
    drying the liquid composition to form an electrically conductive composition in the conductive pattern to cause the electrical circuit to resonate when exposed to electromagnetic energy at a frequency within a predetermined frequency range.

12. The tag of claim 11 wherein the step of making the electrical circuit includes forming an inductive element and the gap is formed in a portion of the inductive element.

13. The tag of claim 11 wherein the step of forming the gap includes acid etching a portion of the conductive pattern.

14. The tag of claim 11 wherein the step of forming the gap includes cutting away a portion of the conductive pattern.

15. The tag of claim 11 wherein the step of forming the gap includes forming the gap at the same time the electrical circuit is formed.

16. A method for deactivating a tag, comprising the steps of:
    forming an electrical circuit on a dielectric substrate, the circuit comprising at least one electrically conductive pattern;
    forming a gap in the conductive pattern to establish an open circuit;
    applying a liquid composition to the conductive pattern to bridge the gap;
    drying the liquid composition to form an electrically conductive composition in the conductive pattern to cause the electrical circuit to resonate when exposed to electromagnetic energy at a frequency within a predetermined frequency range; and
    reestablishing the gap in the conductive pattern by exposing at least a portion of the conductive composition to a fluid for a predetermined time to cause at least a portion of the conductive composition to partially dissipate resulting in an electrical open circuit condition in the electrical circuit to prevent the electrical circuit from resonating within the predetermined frequency range.

17. A tag comprising:

a dielectric substrate having first and second opposite principal surfaces;

an electrical circuit comprising an electrically conductive pattern formed on at least one of the principal surfaces of the dielectric substrate, the conductive pattern including a gap which establishes an electrical open circuit in the electrical circuit; and an electrically conductive composition bridging the gap in the conductive pattern which temporarily establishes an electrical closed circuit in the electrical circuit such that the electrical circuit resonates when exposed to electromagnetic energy at a frequency within a predetermined frequency range, the composition being such that exposing the composition to a fluid for a predetermined time causes at least a portion of the composition to at least partially dissipate resulting in an electrical open circuit condition in the electrical circuit which prevents the electrical circuit from resonating within the predetermined frequency range.

18. The tag of claim 17 wherein the fluid is at least one of water and dry cleaning fluid.

19. A tag comprising:

a dielectric substrate having first and second opposite principal surfaces;

an electrical circuit comprising an electrically conductive pattern formed on at least one of the principal surfaces of the dielectric substrate, wherein the conductive pattern includes a gap which establishes an electrical open circuit; and an electrically conductive composition including electroconductive particles bridging the gap in the conductive pattern to temporarily establish an electrical closed circuit wherein the electrical circuit resonates when exposed to electromagnetic energy at a frequency within a predetermined frequency range wherein exposing the tag to a mechanical force for a predetermined time causes at least a portion of the composition to at least partially dissipate resulting in an electrical open circuit condition in the electrical circuit which prevents the electrical circuit from resonating within the predetermined frequency range.

20. The tag of claim 19 wherein exposing the conductive composition to at least one of water and dry cleaning solution for a predetermined time does not cause the conductive composition to dissipate.

21. The tag of claim 19 wherein the mechanical force is caused by flexing the tag.

22. A method for deactivating a tag, comprising the steps of:

forming an electrical circuit on a dielectric substrate, the circuit comprising at least one electrically conductive pattern;

forming a gap in the conductive pattern to establish an open circuit;

applying a liquid composition to the conductive pattern to bridge the gap;

drying the liquid composition to form an electrically conductive composition in the conductive pattern to cause the electrical circuit to resonate when exposed to electromagnetic energy at a frequency within a predetermined frequency range; and reestablishing the gap by exposing the tag to a mechanical force for a predetermined time to cause at least a portion of the conductive composition to at least partially dissipate resulting in an electrical open circuit condition in the electrical circuit to prevent the electrical circuit from resonating within the predetermined frequency range.

23. The method of claim 22 wherein the step of exposing the tag to a mechanical force is accomplished by flexing the tag.

24. A tag comprising:

a dielectric substrate having first and second opposite principal surfaces;

an electrical circuit comprising an electrically conductive pattern formed on at least one of the principal surfaces of the dielectric substrate, wherein the conductive pattern includes a gap which establishes an electrical open circuit; and an electrically conductive composition including electroconductive particles dispersed in a water based dispersion bridging the gap in the conductive pattern to temporarily establish an electrical closed circuit whereby the electrical circuit resonates when exposed to electromagnetic energy at a frequency within a predetermined frequency range.

25. The tag of claim 24 wherein the electrical circuit includes an inductive element and the gap is formed in a portion of the inductive element.

26. The tag of claim 25 wherein the inductive element includes a coil.

27. The tag of claim 25 wherein the inductive element includes a transmission line.

28. The tag of claim 24 wherein exposing the tag to a mechanical force for a predetermined time causes at least a portion of the composition to at least partially dissipate resulting in an electrical open circuit condition in the electrical circuit which prevents the electrical circuit from resonating within the predetermined frequency range.

29. The tag of claim 24 wherein exposing the conductive composition to at least one of water and a dry cleaning solution for a predetermined time does not cause the conductive composition to dissipate.

30. A tag comprising:

a dielectric substrate having first and second opposite principal surfaces;

an electrical circuit comprising an electrically conductive pattern formed on at least one of the principal surfaces of the dielectric substrate, wherein the conductive pattern includes a gap which establishes an electrical open circuit; and an electrically conductive composition including electroconductive particles bridging the gap in the conductive pattern to temporarily establish an electrical closed circuit therein, the electrical circuit resonating when exposed to electromagnetic energy at a frequency within a predetermined frequency range, wherein exposing the conductive composition to a mechanical force for a predetermined time causes at least a portion of the composition to at least partially dissipate resulting in an electrical open circuit condition in the electrical circuit which prevents the electrical circuit from resonating within the predetermined frequency range, and exposing the conductive composition to at least one of water and a dry cleaning solution for a predetermined time does not cause the conductive pattern to dissipate.

* * * * *